(12) United States Patent
Fleming, III

(10) Patent No.: US 8,252,137 B2
(45) Date of Patent: Aug. 28, 2012

(54) BUILDING PANEL HAVING PLANT-IMITATING STRUCTURAL CORE

(76) Inventor: Joseph C. Fleming, III, Diamond Bar, CA (US)

( * ) Notice: Subject to any disclaimer, the term of this patent is extended or adjusted under 35 U.S.C. 154(b) by 308 days.

(21) Appl. No.: 12/584,165

(22) Filed: Aug. 31, 2009

(65) Prior Publication Data
US 2011/0047932 A1    Mar. 3, 2011

(51) Int. Cl.
*B29C 65/00* (2006.01)
*B32B 37/02* (2006.01)
*B32B 38/04* (2006.01)

(52) U.S. Cl. ........ 156/264; 156/197; 156/222; 156/292; 156/290

(58) Field of Classification Search .................. 156/197, 156/221, 222, 258, 264, 266, 292, 269, 270, 156/290; 428/116; 52/745.19, 576, 783.1
See application file for complete search history.

(56) References Cited

U.S. PATENT DOCUMENTS

| | | | |
|---|---|---|---|
| 2,815,795 A | 12/1957 | Vander Poel | |
| 2,910,396 A * | 10/1959 | Randall et al. | 428/118 |
| 3,077,223 A | 2/1963 | Hartsell et al. | |
| 3,386,218 A | 6/1968 | Scott | |
| 3,483,070 A * | 12/1969 | Kennedy et al. | 428/118 |
| 3,640,039 A | 2/1972 | McKee et al. | |
| 3,700,522 A | 10/1972 | Wonderly | |
| 3,895,144 A | 7/1975 | Kiefer | |
| 4,093,762 A | 6/1978 | Kiefer | |
| 4,349,303 A * | 9/1982 | Liebel et al. | 410/154 |
| 4,603,531 A | 8/1986 | Nash | |
| 5,480,117 A | 1/1996 | Fleming, III | |
| 5,601,266 A | 2/1997 | Fleming, III | |
| 5,804,278 A * | 9/1998 | Pike | 428/116 |
| D523,780 S | 6/2006 | Conny et al. | |
| D533,950 S | 12/2006 | Givoni | |
| 7,288,164 B2 * | 10/2007 | Roberge et al. | 156/292 |
| D556,346 S | 11/2007 | Schulte | |
| D563,215 S | 3/2008 | Collins et al. | |
| 2002/0108323 A1 | 8/2002 | Gruber | |

FOREIGN PATENT DOCUMENTS

JP    4-112001    *    4/1992

OTHER PUBLICATIONS

Paper honeycomb production, http://paper-honeycomb.com. 2 pages, May 15, 2009.
Periodic Cellular Materials: Manufacturing, www.ipm.virginia.edu, 6 pages, May 15, 2009.

* cited by examiner

*Primary Examiner* — Linda L Gray
(74) *Attorney, Agent, or Firm* — Weide & Miller, Ltd.

(57) ABSTRACT

A building or structural panel has a core and outer skins. The core is formed from a stack of layers of building stock such as plywood. Multiple layers of building stock are connected, such as by adhesive at spaced intervals along the lengths thereof to form a stack. The stack is cut into a plurality of strips. Each strip is expanded to form the core. The core comprises a matrix of supporting elongate members and voids or openings. Skins are connected to each side of the core, such as with adhesive, to form the panel. The panel may be cut to size. Anchors or other mounts may be connected to panel.

20 Claims, 5 Drawing Sheets

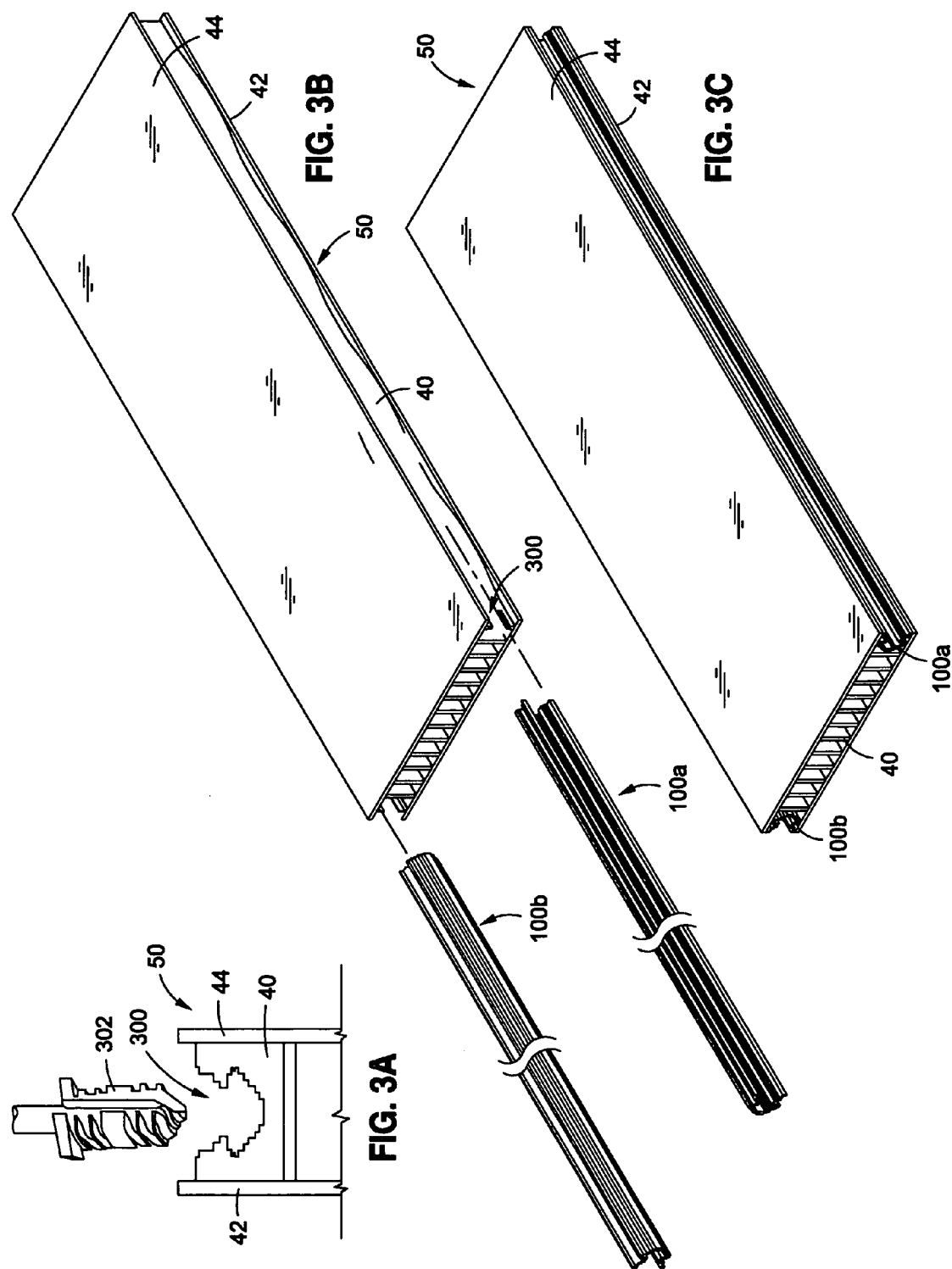

BUILDING PANEL HAVING PLANT-IMITATING STRUCTURAL CORE

FIELD OF THE INVENTION

The present invention relates to a building panel having a core and outer skins.

BACKGROUND OF THE INVENTION

Building panels have a wide variety of configurations. For example, some building panels may comprise solid plywood or particle wood board. These panels are heavy and utilize a substantial volume of material. In addition, such panels are often not very flexible, especially in the case of particle board.

Various attempts have been made to construct other panels which are stronger and lighter in weight. For example, some panels have been constructed from metal. These panels, however, are very expensive both because of the cost of the base materials and the production costs. They are also generally very strong, but not very light.

Some wood panels have been constructed with hollow cores or cores of light-weight material. For example, some panels are constructed by applying thin sheets of plywood to either side of a frame having an open center. In this configuration, the core or center of the panel is hollow. These panels are light-weight, but not very strong.

In order to increase the strength of these open-core type panels, foam may be sprayed into the interior or a paper honeycomb material may be located in the interior. However, these panels have a number of other drawbacks. For example, these panels must be pre-constructed in a particular size determined by the size of the frame. Once such a panel is constructed, it is not possible to change the size of the panel. For example, if such a panel is cut in half, the cut severs the supporting frame, causing one or more sides of the cut panels to have no structural integrity.

An improved panel which is light-weight, strong, and inexpensive, is desired.

SUMMARY OF THE INVENTION

One aspect of the invention is a building panel and a method of making a building panel. Other aspects of the invention comprise methods of anchoring or connecting building panels.

In one embodiment, a panel comprises a structural core and a pair of outer skins or coverings. The core comprises a matrix of supporting members which surround or define voids or openings.

In a preferred embodiment, layers of building stock are connected to one another at specific locations. Each layer of building stock may comprise a thin layer of plywood. Each layer may comprise multiple pieces of building stock arranged end to end. Adhesive may be located at intervals along a length of the first layer of building stock. A second layer of building stock may then be connected to the first layer. This process may be repeated until a stack is formed of multiple layers of building stock. The stack is cut into strips. Each strip may be rotated and then expanded. When expanded, the individual layers of building stock separate in accordion fashion. Adjacent layers are selectively connected at one or more locations and separate from one another at other locations to define openings or voids.

The core may be located between skins or coverings. The skins might comprise, for example, plywood sheets or lauan panels. The skins may be connected to the core with adhesive.

The resulting panel is closed on each side or face by the skins. The skins are supported by the structural core. The panel is strong and lightweight, owing to the hollow configuration of the core and the intertwined or interlaced structural members of the core. The panel may be cut without jeopardizing the structural integrity of the core because of the unitary natural of the core.

In one embodiment, anchors or other elements may be associated with a panel. A slot may be formed in an edge of the panel, such as through the edge of the core between the skins. An elongate extruded anchor may be inserted into the slot. The anchor may be used to protect the edge of the panel and to mount the panel to other panels or other structures. In another embodiment, a slot may also be formed in the skin or face of the panel and the core underlying the skin. Structural elements such as anchors or other elements may be located in such a slot at the face of the panel.

Further objects, features, and advantages of the present invention over the prior art will become apparent from the detailed description of the drawings which follows, when considered with the attached figures.

DESCRIPTION OF THE DRAWINGS

FIG. 3A illustrates a step of cutting an anchor slot into a panel;

FIG. 3B illustrates placement of an anchor into an anchor slot in a panel; and

FIG. 3C illustrates a panel including a panel anchor.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a building panel. As will become apparent later, such panels may be used for a variety of purposes. The uses of such panels are not intended to limit the scope of the invention herein. For example, the panels of the invention may be used to form walls or floors, or be used as doors, dividers or for other purposes.

In general, the panel of the invention has a core and a pair of opposing outer skins. The core preferably emulates a plant-like structure, having a number of structural elements and open spaces or voids. Other aspects of the invention comprise methods of making such panels, connectors for such panels, and methods of connecting panels.

One configuration of a panel of the invention will best be understood from a method of making a panel in accordance with a preferred embodiment of the invention. Referring to FIG. 1, a first row or layer 22 of building stock or material is provided. In a preferred embodiment, the building stock comprises plywood. Preferably, the building stock is generally planar, such as plywood having a thickness of 3 mm, 6 mm or 9 mm. In one embodiment, the first layer 22 of building stock is configured with set dimensions. For example, the first layer 22 of building stock may be 48 inches wide. In order to arrange the building stock in this configuration, it may be cut from base stock. For example, 48 inch by 48 inch plywood squares may be cut from base plywood sheets that are 48 inches wide by 96 inches long.

Figure 1A:
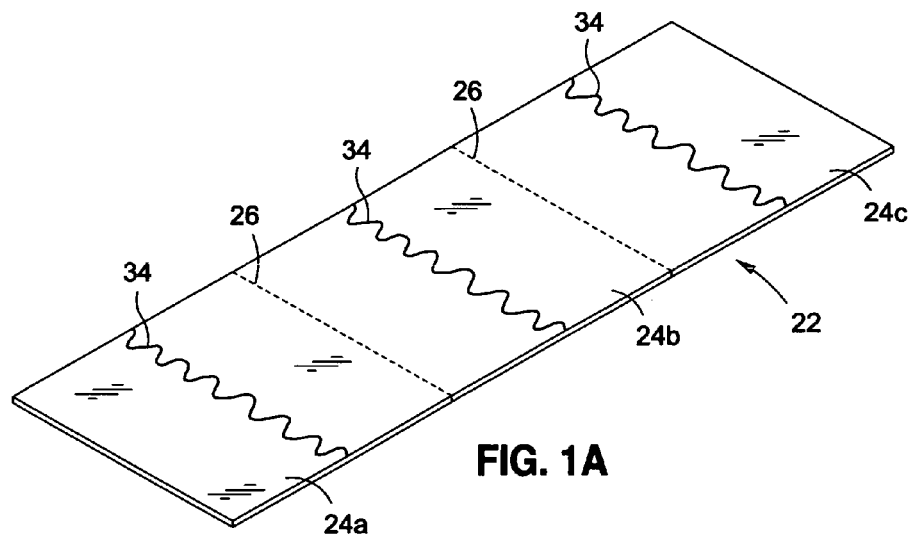
FIG. 1A illustrates a first layer of building stock used to form a panel of the invention.

FIG. 1A illustrates a configuration in which the first layer 22 is formed from a plurality of individual building stock pieces 24a,b,c. As illustrated, each piece 24a,b,c has dimensions of 48 inches by 48 inches. The pieces 24a,b,c are arranged into a row which is 48 inches wide by 144 inches long. In such a configuration, the pieces 24a,b,c are arranged end-to-end, with seams 26 at their intersections. Preferably, the pieces 24a,b,c are arranged so that their vertical grains align or extend parallel to one another. Of course, depending upon the desired length of the panel to be created, the layers of building stock might comprise singular elements.

Figure 1B:
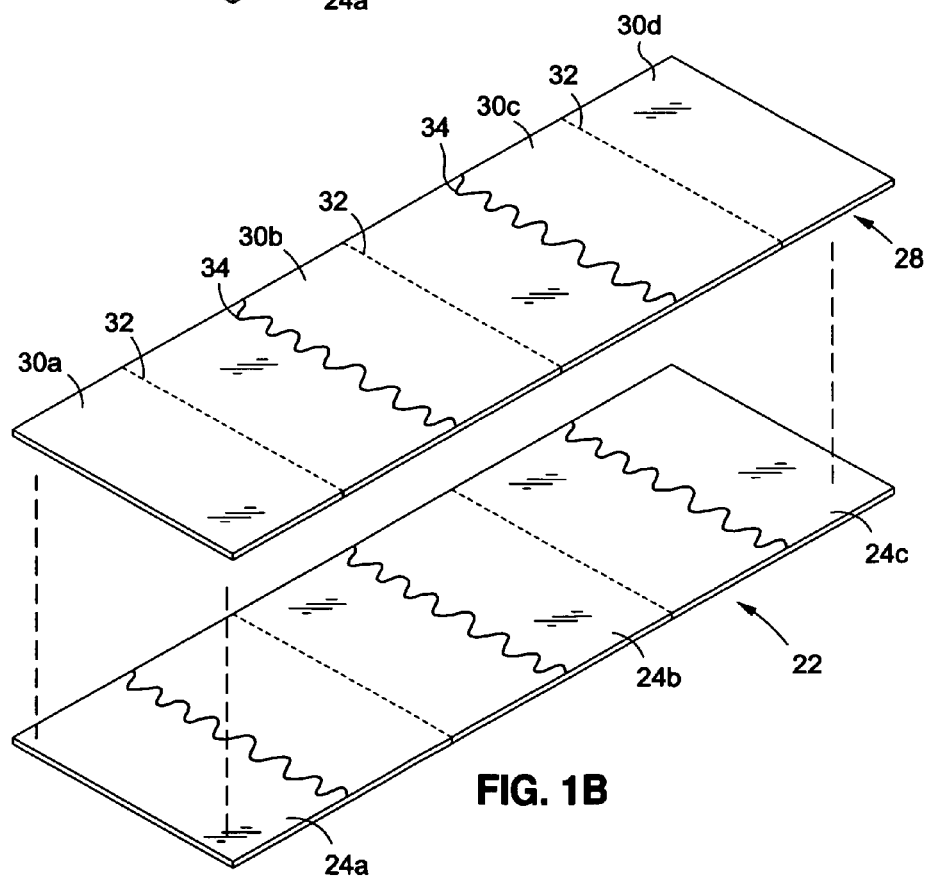
FIG. 1B illustrates first and second layers of building stock being connected to one another.

Referring to FIG. 1B, a second layer 28 of building stock is placed on the first layer 22. Preferably, the second layer 28 is similar to the first layer 22. For example, the second layer 24 may be defined by a plurality of pieces 30a,b,c,d of thin plywood stock. So that seams 32 between the individual pieces forming the second layer 28 do not overlap with the seams 26 of the first layer 22, they may be offset. This may be accomplished by starting the second layer 24 with a shorter piece 30a, such as a piece which is only 24 inches long. Of course, if the layers comprise singular elements of building stock, no offset is necessary.

Referring to both FIGS. 1A and 1B, the second layer 28 is connected to the first layer 22. In one embodiment, adhesive is utilized to connect the layers of material. In a preferred embodiment, the layers are connected at defined intervals. Referring to FIG. 1A, adhesive 34 may be applied across the width of each piece 24a,b,c at each end of the layer and at the midpoint of each piece 24a,b,c. Thus, when the pieces are 48 inches long, this means that the adhesive 28 is applied at 24 inch intervals, and the second layer 28 will thus be connected to the first layer 22 at such intervals. Of course, the layers 22,24 may be connected at other intervals. As one example, if the first layer 24 is 96 inches long, in one embodiment adhesive would be applied in 5 locations (at the ends and 3 locations spaced 24 inches apart there between). In one embodiment, the adhesive 34 is applied in a double line or strip at each location. The adhesive 34 might comprise an exterior amphelic resin glue, preferably having an open working time of about 2 hours or more.

Figure 1C:
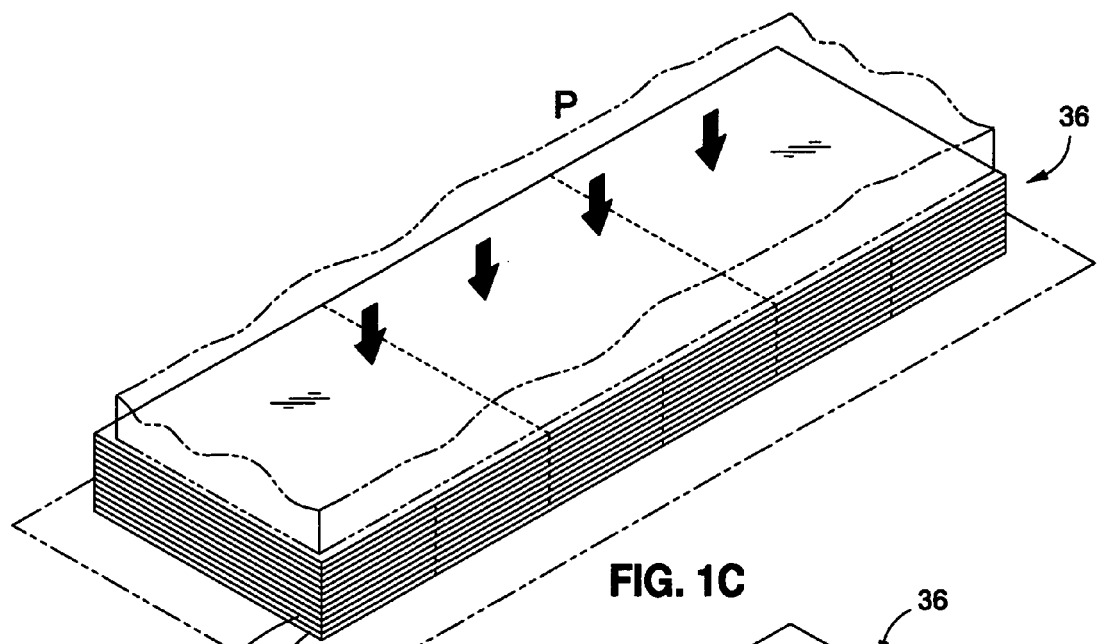
FIG. 1C illustrates a stack formed from a plurality of layers of connected building stock.

As illustrated in FIG. 1B, adhesive 34 may similarly be applied to the second layer 24 for connecting a third layer (not shown). The third layer may be configured so that any seams between pieces forming that layer are again offset from the seams of the second layer and so that the adhesive joins are offset from those of the first layer. This process may be repeated until, as illustrated in FIG. 1C, a stack 36 is formed. This stack 36 comprises a plurality of individual layers of building material, those layers connected to one another at defined locations. Preferably, the stack 36 is formed from multiple layers of building material. For example, the stack 36 might comprise as many as 20 or more layers (there could be a lesser number of layers, or even as many as 50 to 75 or more layers).

As illustrated in FIG. 1C, the stack 36 may be located in a press P which compresses the rows or layers of material for a period of time which allows the adhesive to set or bond. This ensures that the rows or layers of materials are securely joined. In one embodiment, the stack 36 is compressed at 90 pounds per square inch for 8 to 12 hours.

Figure 1D:
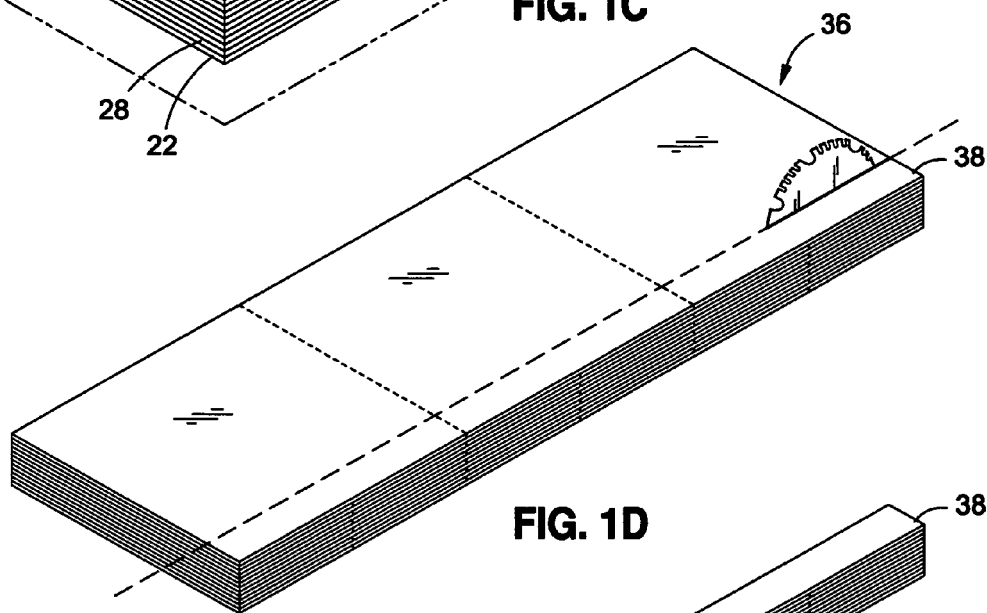
FIG. 1D illustrates the stack of FIG. 1C being cut into a plurality of strips.
Figure 1E:
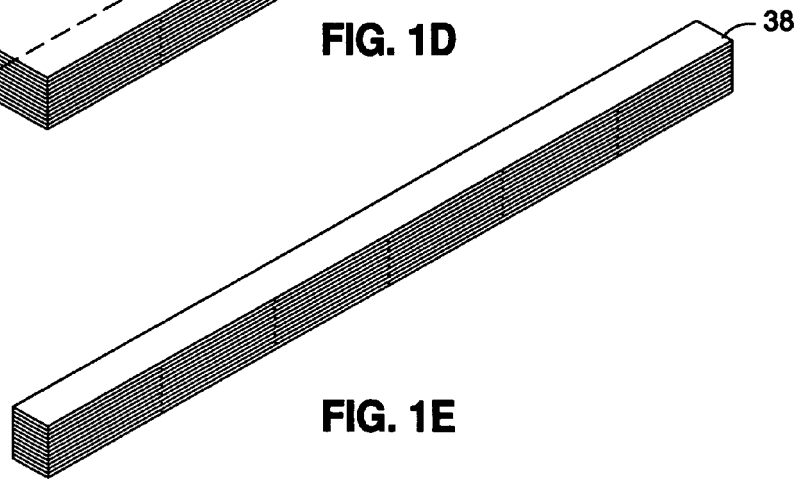
FIG. 1E illustrates one of the strips cut from the stack illustrated in FIG. 1D.

As illustrated in FIG. 1D, the stack 36 is then cut into strips 38, a single of which is illustrated in FIG. 1E. The strips 38 may have various widths. In one embodiment, the strips 38 are about 2 inches wide. In a configuration in which the stack 36 is 48 inches wide, about 22 strips may be created from the stack 36 (some loss owing to cutting of the stack). The stack 36 may be cut in various fashions. As illustrated, in one embodiment, the stack 36 may be cut using a table saw.

Figure 1F:
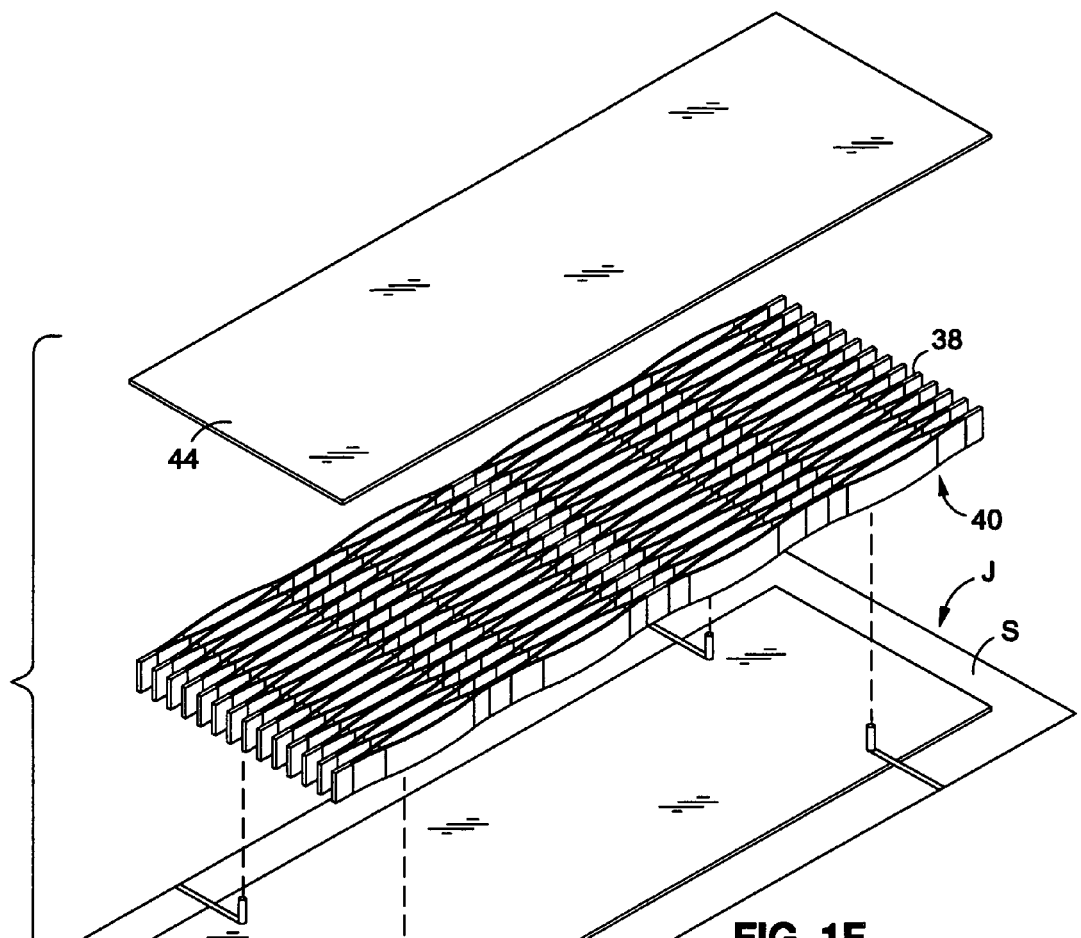
FIG. 1F illustrates the strip of FIG. 1F being expanded into a core on a jig and located between top and bottom skins to form a panel of the invention.

Referring to FIG. 1F, each strip 38 may then be expanded. As illustrated, the strip 38 may be rotated 90 degrees so that the layers of material forming the strip 38 are oriented vertically, rather than horizontally. The strip 38 may then be expanded in accordion-like fashion. As illustrated, the individual layers 22,28 of material are selectively joined at certain locations (at adhesive points) and free from one another at other locations (the areas between the adhesive joins), the expanded strip thus forming a pattern or grid structure having openings or voids 40 therein.

As illustrated in FIG. 1F, the strip 38 may be expanded on a table or jig J. The jig J may comprise a planar support S having a plurality of positionable anchors or catches C. The catches C may comprise, for example, metal pins. The strip 38 may then be connected to the catches C at one side of the jig J and then pulled and expanded until it reaches the other side of the jig J, where it is connected to the catches C to maintain the strip 38 in an expanded position. The catches C are preferably arranged to maintain the strip 38 in an expanded position of a desired size. For example, the strip 38 may be expanded so that it is 48 inches wide (the length of the strip 38 does not change substantially between its expanded and unexpanded states, and is primarily governed by the length of the stack 36 as constructed from the layers of building stock).

In its expanded state, the strip 38 comprises a core 40 for the panel of the invention. Additional details and aspects of the core 40 will be described in more detail below.

Figure 1G:
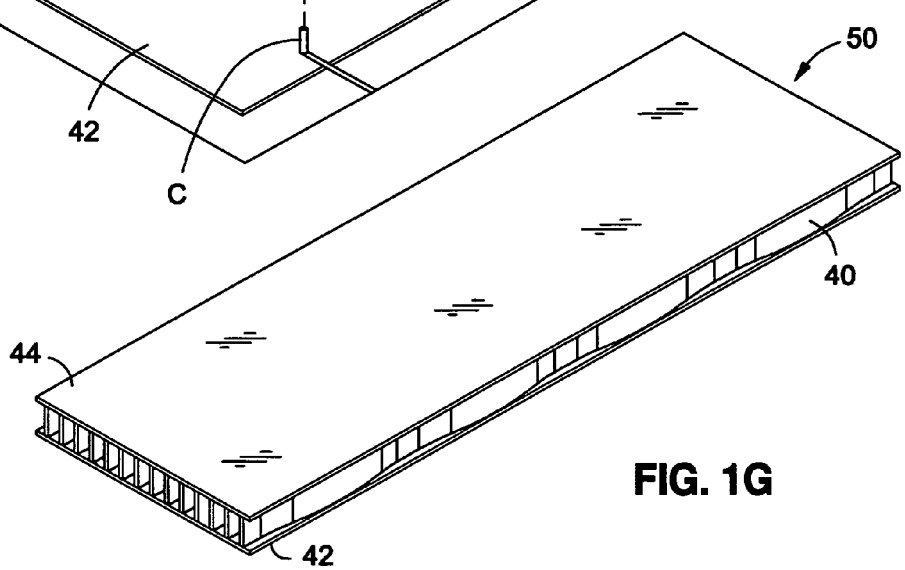
FIG. 1G illustrates a panel of the invention comprising a core located between a pair of skins.

As illustrated in FIG. 1G, exterior members, coverings or skins are preferably applied to opposing sides of the core 40. In one embodiment, the skins are connected to the core 40 with adhesive. Adhesive is applied to opposing sides of the core 40. The adhesive may be applied to the expanded core 40, but is more easily applied to the strip 38 before it is expanded. In one embodiment, the adhesive is Reac Tite 8143 (a single part moisture activated polyurethane) available from Franklin Glue or Utilithane 1600 (a two part polyurethane) by Prime Coatings, Inc.

Once the adhesive is applied, a first skin 42 may be applied to a first side of the core 40, and a second skin 44 may be applied to the opposing second side of the core 40. In one embodiment, the first skin 42 may be located on the jig J, as illustrated in FIG. 1F. The strip 38 may then be located over the first skin 42. The catches C are moved into position and the strip 38 is connected to the catches C at one side of the jig J. The strip 38 is then expanded and held in position using the catches C at the opposing side of the jig J. The second skin 44 may then be applied over the expanded core 40.

The skins 42,44 may comprise a variety of materials. For example, the skins 42,44 might comprise thin plywood sheeting such as a lauan panel, a high pressure laminate (such as FORMICA®, a registered trademark of Formica Corporation), an oriented strand board (OSB), plastic or PVC sheeting, aluminum or other metal, or other material. The skins 42,44 might have one or more finished surfaces, such as an outer surface which is stained, painted or the like.

After the skins 38 are attached, the assembly may be located in a press. The assembly of skins 42,44 and the core 40 may, for example, be held under 90 psi for 18 minutes, to allow the adhesive to set. The assembly may then be removed from the pressed and allowed to cure, such as for a minimum of 4 hours. The assembly may be trimmed square, such as using a double edge tenor or a CNC router.

The skins 42,44 preferably have a peripheral size which is substantially the same as the core 40. Thus, the length of the skins 42,44 is approximately the same as the length of the core 40, and the width of the skins 42,44 is approximately the same as the width of the core 40.

Once the skins 42,44 are connected to the core 40, the combination thereof comprises a panel 50. FIG. 1G illustrates the assembled panel 50. A number of aspects of the panel 50 of the invention will now be appreciated. In one embodiment, the panel 50 comprises a pair of skins 42,44 or coverings and an interior core 40. The skins 42,44 or coverings define opposing sides or faces of the panel 50. The thickness of the panel is determined by the thickness of each skin and the thickness of the core 40. The panel 50 has a periphery. When the panel 50 is quadrilateral in shape, it has four sides and thus four corresponding edges. As illustrated, the edges are generally defined by the core 40. At opposing ends of the panel 50, the connected and unconnected portions of the layers of building stock which form the core are exposed. At opposing side edges, the exterior-most layer of building stock forming the core is visible. This exterior-most member undulates in and out towards the edge of the panel 50 based upon the accordion configuration of the core 40.

For example, the panel 50 may be about 48 inches wide, 96 inches tall, and about 2.5 inches thick (depth). In that configuration, the skins 42,44 and the core 40 all have a width of about 48 inches and a height of about 96 inches. The core 40 may be 2 inches thick and the skins 42,44 may each be about 0.25 inches thick.

The core has a number of important features. First, the core comprises a plurality of elongate members. These members comprise strip portions of the layers of building stock which were used to form the stack. Importantly, the elongate members are connected to one another in one or more locations, thus comprising a matrix or grid structure. In addition, the core comprises openings or voids defined between the elongate members. These openings or voids lessen the mass of the core. Relative to the expanded size of the core 40, the openings or voids may comprise a substantial volume of the space occupied by the core.

In a preferred embodiment, the structure of the core results in panel of substantial strength. First, the elongate members run the length of the panel from one end to another. In this manner, the members, and thus the core, provide end to end strength for the panel. The elongate members, comprising strips of plywood or a similar material, also resist compression. Thus, the core prevents the skins from being compressed towards one another. Lastly, the elongate members are connected to one another across the width of the panel. In this manner, the core provided side-to-side strength of the panel. In addition, the skins add to the strength of the panel.

Advantageously, the panels of the invention may be cut into various shapes and sizes. The panels of the invention may also be connected to one another or other members or structures.

First, the panels may be cut. For example, a panel may be cut in half along its width or along its length. Importantly, regardless of how the panel is cut, the strength and integrity of the divided portions of the panel are maintained. This is because the core still remains in tact in each divided portion of the panel. Thus, as to each divided portion of the panel, some part of the grid of elongate members which forms the core exists therein, including along the newly formed edges of the divided panel portions. This is unlike prior panel designs in which covers were located over a perimeter frame. In that prior art configuration if a panel was cut width-wise or length-wise, the portions of the panel along the cut edge would have no structural integrity because there would no longer be a supporting frame element along that cut edge. An advantage of this aspect of the invention is that the panel can be re-sized at a job site. As indicated, in the prior art, a panel had to be custom-configured during manufacture. If the panel is shipped to a job and is the wrong size, the process must begin again with the manufacture of a new panel. However, in accordance with the present invention, a panel can be manufactured in a generic size and shipped to a job. The user can then cut the panel to any desired size for use in various applications. In addition, a panel can be cut into a plurality of sub-panels, thus creating multiple panels.

A substantial advantage of the invention is that the configuration of each panel core can be changed without changing the method of manufacture of the core. In particular, the extent to which a core is expanded can be used to adjust the strength of the core and the density or weight of the core. For example, a single stack might produce 10 strips. A first strip might be expanded so that it is 48 inches in width. A second strip might be expanded so that it is 96 inches in width. If both cores are used with skins that are 48 inches in width, the second core will be cut in half. The first core will then have twice as many supporting members than the second core, and likewise the second core will have twice as much void or open space therein. Thus, the first core will have a higher density and strength, but greater weight that the second core, and likewise the second core will be less strong but be much lighter than the first core. These two cores might be used in different applications where factors of weight or strength have different levels of importance. In both cases, however, the strips forming the core could be cut from the same stack.

In a preferred embodiment of the invention, the core of the panel has a structure which is similar to or emulates the xylem structure of a plant. In particular, the core has elongate structural members or fibers defining or surrounding voids or openings. In one embodiment, those openings are olive-shaped. This structure allows the core to be load bearing in both the vertical (top to bottom) and horizontal (side to side) direction.

Figure 2A:
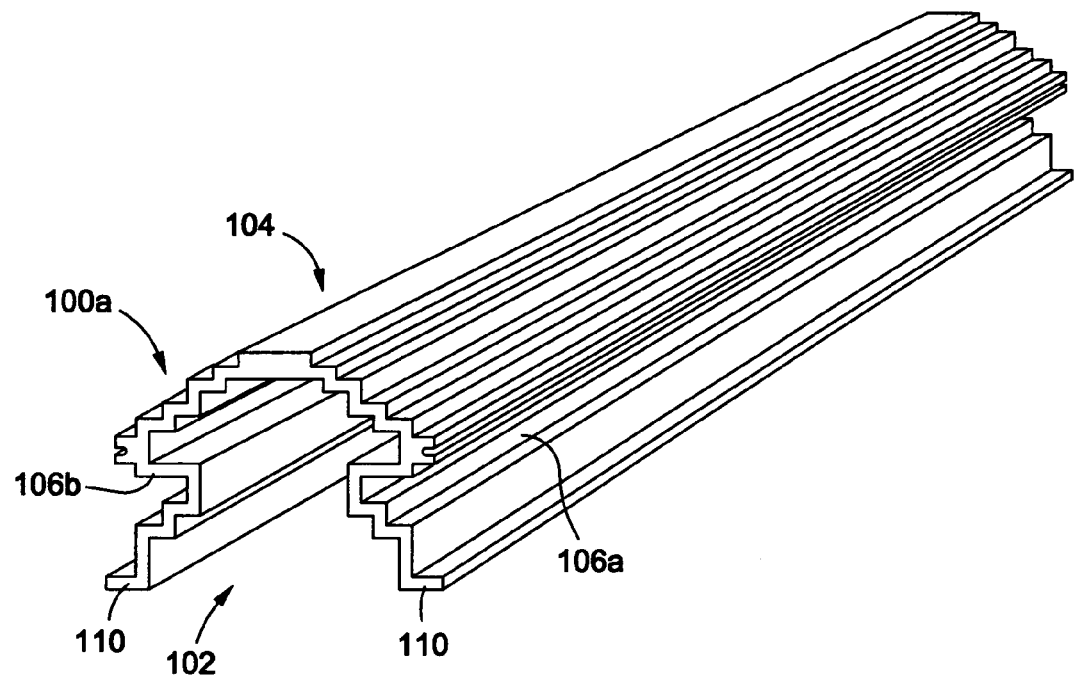
FIG. 2A illustrates a panel anchor in accordance with an embodiment of the invention.
Figure 2B:
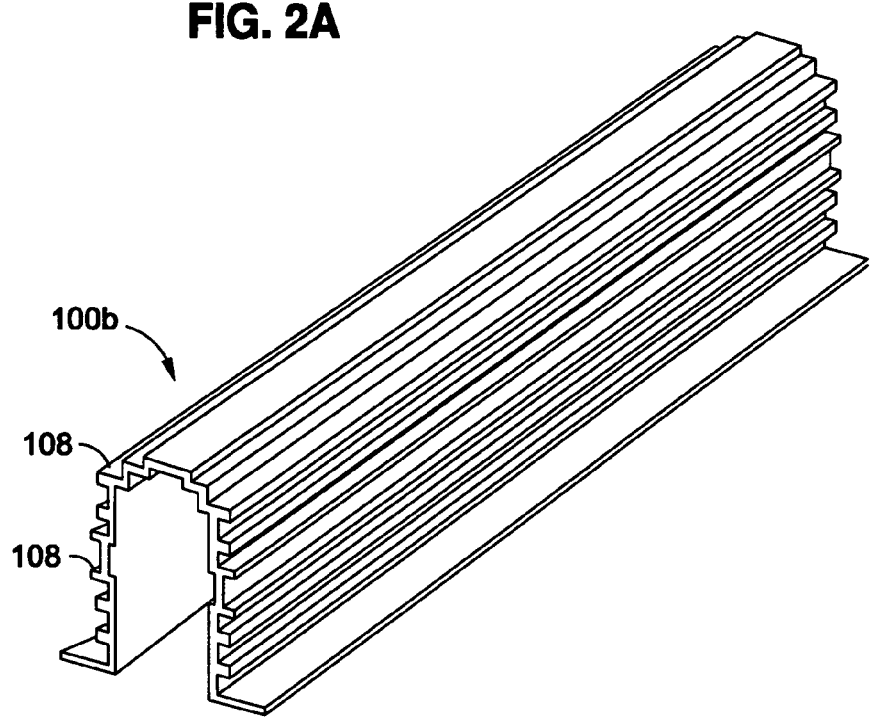
FIG. 2B illustrates another embodiment of a panel anchor.

The panels may be connected to one another and/or other members. One aspect of the invention comprises panel anchors and methods of anchoring panels. FIGS. 2A and 2B illustrates two different anchors. As illustrated in FIG. 2A, one anchor 100a may comprise an elongate extruded metal (such as aluminum) member. In one embodiment, the anchor 100a has a top 102 and a bottom 104. The top 102 may be generally open, while the bottom 104 is generally closed. A pair of sides 106a,b, extend from the bottom 104 towards the top 102. In this configuration, the anchor 100a has the shape of a trough.

In the embodiment illustrated, the bottom 104 of the anchor 100a is generally planar. The sides 106,a,b may comprise walls. The sides or walls 106a,b, preferably define a plurality of steps or protrusions. One or more of the portions of the walls 106a,b may extend back towards a center of the anchor 100a. As detailed below, the configuration of the walls 106a,b is preferably selected to prevent rotation of the anchor 100a when it is placed in a panel 50.

Each side or wall 106a,b defines an outwardly extending flange 110 at the top 102 of the anchor 100a. Each flange 110 preferably comprises a generally planar area.

FIG. 2B illustrates another embodiment of an anchor 100b. This anchor 100b may comprise a plastic extrusion. The anchor 100b may again have a bottom and a top and a pair of walls. In this configuration, the walls may be generally vertical. To prevent rotation of the anchor 100b, a plurality of fins 108 may extend outwardly from the walls.

It will be appreciated that the anchor of the invention may have other configurations.

A method of installing an anchor will be described with reference to FIGS. 3A-3C. As illustrated in FIG. 3A, in one embodiment, a slot 300 is formed in the edge of a panel 50. Notably, because of the strength and rigidity of the core 40 of the panel 50, an anchor can be installed along any edge. For example, an anchor may be installed along a side of a panel 50 (i.e. parallel to the direction that the elongate members of the core 40 extend) or along an end of a panel 50 (i.e. across the width of the core 40). FIG. 3A illustrates one embodiment of the method in which a slot 300 is formed in the core 50 along one side of the panel 50.

As illustrated, the slot 300 may be formed by passing a cutter 302 along the side of the panel 50. The cutter 302 preferably has a profile which matches the anchor to be installed. For example, the cutter 302 may be a rotary bit, such as a router bit. The cutter 302 passes through the core 40 along its length adjacent the side of the panel 50.

As illustrated in FIG. 3B, a corresponding anchor 100 may be located in the slot 300, such as by sliding the elongate anchor 100 into the slot 300. The anchor 100 may be secured to the panel 50 in various manners, such as with fasteners, adhesive or the like.

Referring to FIG. 3C, once the anchor 100 is placed, the flanges 110 at the top 102 thereof protect the surrounding portions of the panel 50. The anchor 100 is also prevented from rotating within the slot 300 or from being pulled outwardly from the slot 300 because the protruding portions thereof are located in corresponding cut-out areas of the slot 300. The anchor 100 extends along the length of the edge of the panel 50, thus protecting that edge of the panel from damage and also adding strength to the panel. The anchor 100 may also be used to connect or mount the panel 50 to one another members.

It will be appreciated that anchors may be utilized which are not extruded and/or which do not extend the entire length of the edge or side of a panel. For example, short anchor members might be located at just the top and bottom portions of an edge of the panel (such that there is no anchor member in the center portion of the edge).

Because of the structure of the panel of the invention, it is also possible to utilize other types of anchors or mounts. For example, a "T" shaped slot may be routed or otherwise formed in the top or bottom skin 42,44 and adjacent core structure 40. A "T" shaped extrusion may be slipped into this slot and may be connected with adhesive or the like to the panel.

The panel of the invention also permits mounting of items to the skins 42,44. For example, a passage may be formed through the core 40 laterally to the mounting point. A dowel or peg may be placed into that passage for intersection with the mount which extends through the skin 42,44 into the core. The dowel or peg is supported by the structure of the core and thus provide substantial support for the mount which extends through the skin 42,44.

The anchors and methods of anchoring have substantial benefits over known techniques associated with existing panels. One advantage of the panel of the invention is that it ready permits formation of a structural slot. This slot is capable of supporting an anchor or other element. The anchor may be used to connect the panel to another panel or other structure/member. The anchor may also be used as an edge protector.

The slot in the panel and/or the anchors may be used to mount an assortment of fasteners or connectors. One or more fasteners may be attached to the anchors and be located in the slot or trough thereof. For example, one or more Norse locks, Simmons locks or wooden gravity cleats may be connected to the anchors. In one embodiment, the anchor may include spaced pins or rods that extend across the trough or channel to which such fasteners may be connected. The trough or slot of the anchor may also be designed to accept standard shelf support, T-slot brackets and similar off-readily available/off the shelf connectors and mounts. For example, the anchors may be configured to accept rotary type locks such as those shown in U.S. Pat. Nos. 5,480,117 and 5,601,266 to the inventor herein. Such fasteners or connectors may be used to connect one panel to another in a secure manner, thus enabling multiple individual panels to be joined into wall sections and other configurations, and/or permitting the panels to be connected to other members or structures.

A particular advantage of the invention is that the structural slot and anchor may be associated with a panel after the panel is manufactured, and even after a panel has been cut. In the prior art an anchor might be associated with a frame of a panel during the manufacture of the panel. However, if that prior art panel is cut, a portion of the frame and thus the associated anchor, may be severed from the panel, rendering it useless. However, the panel of the invention can be cut and a slot can be formed any portion thereof at any time (either in an edge or even in a face or skin thereof, as detailed above). Thus, a panel can be cut and slots can be formed in the new edges of both new panel portions. Anchors can then be located in those slots, whereby custom configured panels with anchors can easily be formed at a job site.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of forming a connectable building panel comprising the steps of:
   providing a first layer of building stock having a length;
   providing at least a second layer of building stock having a length;
   connecting said first and second layers of building stock at spaced intervals along said lengths thereof to form a stack;
   cutting said stack into a plurality of strips;
   expanding at least one of said strips into a core;
   anchoring said core in said expanded position of a desired size wherein said layers of building stock are connected to one another at various locations and wherein a plurality of voids are defined between said layers at other locations;
   providing a top skin and a bottom skin;
   locating said core between said top skin and said bottom skin;

while said core is maintained in said expanded position, adhering said top skin to said core and said bottom skin to said core to form an assembled building panel having a top edge, a bottom edge, a first side edge and a second side edge;

forming a first channel in said first side edge of said building panel;

locating a first connector anchor in said first side edge of said building panel;

forming a second channel in said second side edge of said building panel; and locating a second connector anchor in said second side edge of said building panel.

2. The method in accordance with claim 1 wherein said first and second layers of building stock each comprise a plurality of pieces of plywood.

3. The method in accordance with claim 1 wherein said step of anchoring comprises mounting said strip to mounts of a jig.

4. The method in accordance with claim 1 comprising providing multiple second layers of building stock and connecting successive second layers of building stock to one another.

5. The method in accordance with claim 1 wherein said step of connecting comprises applying adhesive to said first and/or second layers across a width of said layers.

6. The method in accordance with claim 1 wherein said top skin and said bottom skin comprise a laminate.

7. A method of constructing a connectable building panel comprising the steps of:

arranging a plurality of building stock pieces into a plurality of layers having a length and a width, each layer having at least one seam, the at least one seam of each layer offset from the at least one seam of adjacent layers;

connecting adjacent layers at particular locations with adhesive extending across a width of said layers and located at spaced intervals along said length of said layers;

forming a stack by compressing said connected layers for a period of time;

cutting said stack into at least two strips, each strip having a top and a bottom;

applying adhesive to said top and bottom of one of said strips;

expanding said strip into a core;

anchoring said core in said expanded position of a desired size wherein said layers of building stock are connected to one another at various locations and wherein a plurality of voids are defined between said layers at other locations;

while said core is maintained in said expanded position, locating said core onto a bottom skin;

while said core is maintained in said expanded position, locating a top skin over said core;

forming a panel by compressing said top skin, core and bottom skin until said adhesive is secure, said panel having a top edge, a bottom edge, a first side edge and a second side edge;

forming a first channel in said first side edge of said panel;

locating a first connector anchor in said first side edge of said panel;

forming a second channel in said second side edge of said panel; and locating a second connector anchor in said second side edge of said panel.

8. The method in accordance with claim 7 wherein said building stock pieces comprise pieces of plywood cut from plywood sheets.

9. The method in accordance with claim 7, wherein said anchoring step comprises mounting said core to mounts of a jig.

10. The method in accordance with claim 7 where said plurality of layers comprises at least 20 layers.

11. The method in accordance with claim 1 wherein said step of forming a first channel comprises forming a slot in said core between said top skin and bottom skin at said first side edge of said panel and said step of forming a second channel comprises forming a slot in said core between said top skin and bottom skin at said second side edge of said panel.

12. The method in accordance with claim 1 wherein said first connector anchor and said second connector anchor each define a trough.

13. The method in accordance with claim 1 wherein said first connector anchor and said second connector anchor each define a flange, said flange of said first connector anchor extending adjacent to edges of said top and bottom skins at said first side edge of said panel and said flange of said second connector anchor extending adjacent to edges of said top and bottom skins at said second side edge of said panel.

14. The method in accordance with claim 11 wherein said steps of forming a slot comprise routing a portion of said core.

15. The method in accordance with claim 1 wherein said first connector anchor and said second connector anchor each comprise elongate members having a length approximately equal to said first and second side edges of said building panel.

16. The method in accordance with claim 7 wherein said step of forming a first channel comprises forming a slot in said core between said top skin and bottom skin at said first side edge of said panel and said step of forming a second channel comprises forming a slot in said core between said top skin and bottom skin at said second side edge of said panel.

17. The method in accordance with claim 7 wherein said first connector anchor and said second connector anchor each define a trough.

18. The method in accordance with claim 7 wherein said first connector anchor and said second connector anchor each define a flange, said flange of said first connector anchor extending adjacent to edges of said top and bottom skins at said first side edge of said panel and said flange of said second connector anchor extending adjacent to edges of said top and bottom skins at said second side edge of said panel.

19. The method in accordance with claim 16 wherein said steps of forming a slot comprise routing a portion of said core.

20. The method in accordance with claim 7 wherein said first connector anchor and said second connector anchor each comprise elongate members having a length approximately equal to said first and second side edges of said building panel.

* * * * *